March 28, 1939. W. C. RUSSELL 2,152,096
THIMBLE
Filed Dec. 3, 1937
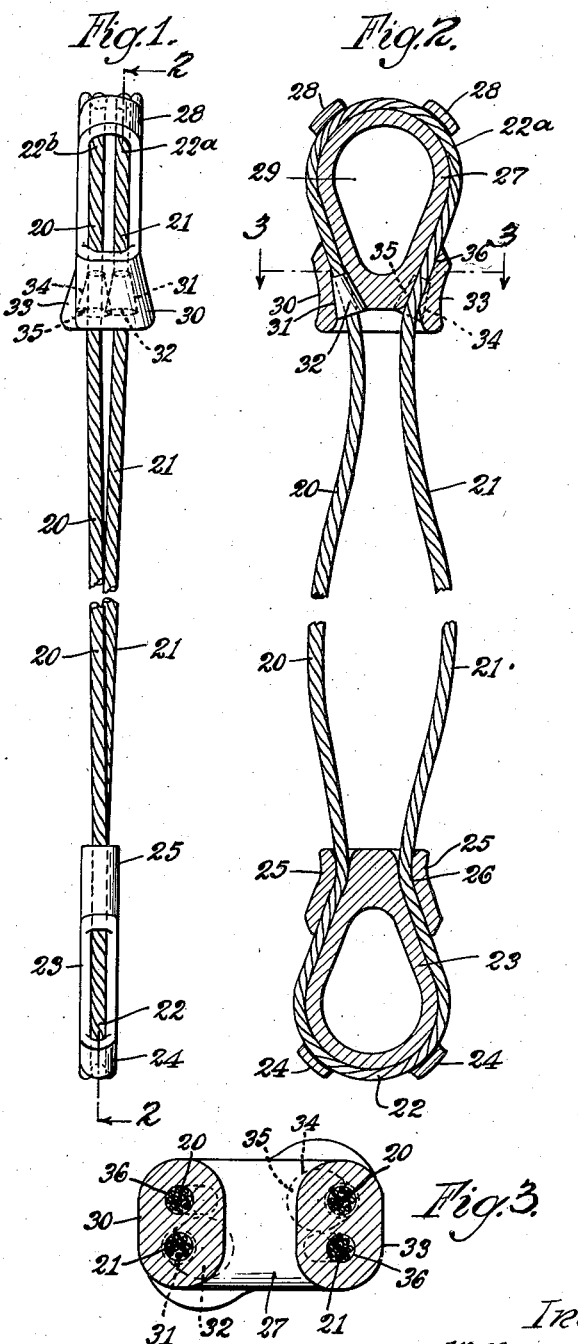
Inventor
William C. Russell
by Parker & Carter
Attorneys.

Patented Mar. 28, 1939

2,152,096

UNITED STATES PATENT OFFICE 2,152,096

THIMBLE

William C. Russell, Kenosha, Wis., assignor to Macwhyte Company, Kenosha, Wis., a corporation of Wisconsin Application December 3, 1937, Serial No. 177,939

8 Claims. (Cl. 294—74)

This invention relates to a sling and to a thimble for use with a sling.

It has for one object to provide a sling so arranged that the cooperation between the sling and thimble is such that when in use the thimble is wholly or partly in compression.

Another object is to provide a sling and thimble construction in which a plurality of sling members or portions are passed once at least about the thimble and thereafter secured to it.

Other objects will appear from time to time in the course of the specification and claims.

The invention is illustrated more or less diagrammatically in the accompanying drawing, wherein:

Figure 1 is a side elevation with parts broken away and parts omitted showing a modified form;

Figure 2 is a longitudinal cross section taken at line 2—2 of Figure 1; and

Figure 3 is a transverse cross section taken at line 3—3 of Figure 2 on an enlarged scale.

Like parts are indicated by like symbols throughout the specification and drawing.

As shown in the figures, a rope or cable forms the body of the sling and has two rope sections 20 and 21. The rope as a whole is bent to form a loop 22 which passes about the thimble 23 and is held against displacement by keepers 24, 24 and also by enlargements 25, 25, each of which is provided with a passage 26 through which the rope passes, and in which it is preferably free for relative movement with respect to the thimble, although if desired it may be secured so that relative movement is not possible.

The sections 20 and 21 have ends 22a and 22b respectively, each of which passes once about a thimble 27 which may have keepers 28, 28 to hold them against displacement. The thimble 27 has an opening 29 and is provided at its end with an enlargement 30 having a tapered pocket 31 within which the enlargement 32, which is mounted upon the end of the member 21, is received. Correspondingly, the thimble 27 carries also an enlargement 33 having a depression or pocket 34 arranged to receive the enlargement 35 upon the end of the member 20. Each enlargement 30, 33 is provided with a passage 36 through which the rope section passes. The size of the passage 36 is such that the rope section is normally free to slide in it and the ropes are thus not rigidly secured to the thimble 27 except at the point where the enlargements are secured to their free ends, engage and wedge into the cavities provided for them.

The use of the form of the device shown in the figures is generally as follows: The rope or cable sections are preferably threaded through the various keepers and passages arranged for them and the enlargements are then applied to the free ends and the latter are pulled back into the pockets or cavities provided for the reception of the enlargement. The bodies of the enlargements are preferably tapered and the cavities preferably also tapered. Any size or shape of these parts which prevents the rope sections and the enlargements from pulling through so as to be displaced from the thimble may be used and are within the contemplation of the invention. After the sling wears sufficiently to require rope replacement, the ropes may be removed in any manner and other ropes are pushed through; enlargements are secured to their ends, they are pulled into place within the cavities provided for the enlargements, and the sling is again ready for use.

I claim:

1. In combination a sling and thimble, said thimble comprising a member defining an eye and having a grooved exterior, and a pair of rope ends, each being passed once about said eye and having its free end secured thereto.

2. In combination a sling and thimble, said thimble comprising a member defining an eye and having a grooved exterior, and a pair of rope ends, each rope end being passed once about said eye and having its free end secured thereto, and being elsewhere in contact with but free to move with respect to said eye.

3. In combination in a thimble adapted for association with a sling means for securing the sling to the thimble and for placing the thimble under compression when a load is carried by the sling, said means comprising parts of said sling, both of said parts being placed freely about said thimble and secured thereto after being so passed about.

4. In combination in a thimble adapted for association with a sling means for securing the sling to the thimble and for placing the thimble under compression when a load is carried by the sling, said means comprising parts of said sling, both of said parts being placed freely about said thimble and secured thereto after being so passed about whereby, said sling portion, except at the point of securing, being free for relative movement with respect to said thimble.

5. In combination a sling and thimble, said thimble comprising a member forming an eye and having a plurality of sling end engaging parts, said sling having two ends, each end being passed once about said eye forming member and into engagement with one of said sling engaging parts, and means for securing the sling and in fixed engagement with sling engaging part, said means comprising an enlargement on said slings.

6. In combination a rope and a thimble, said thimble comprising a member defining an eye, and a pair of rope ends, each being passed once about said eye and having its free end secured thereto one of said ends being secured centrally of said thimble and the other to the side thereof.

7. In combination a rope and a thimble, said thimble comprising a member defining an eye, and a pair of rope ends, each rope end being passed once about said eye and having its free end secured thereto, and being elsewhere in contact with but free to move with respect to said eye.

8. In combination a rope and a thimble, said thimble comprising a member defining an eye and having a grooved exterior, and a rope member having two ends, one of said ends being passed once about said thimble before being secured thereto, the thimble being provided with a pair of sockets positioned one on each side thereof out of alignment with the center thereof, each of said rope ends being secured in one of said sockets and passing about the thimble before being received in said socket.

WILLIAM C. RUSSELL.